United States Patent [19]

Jackson et al.

[11] 4,086,299

[45] Apr. 25, 1978

[54] COPOLYMERS OF AN ALLYLAMINE GRAFTED ONTO AN UNSATURATED BENZOIN COPOLYMER

[75] Inventors: Mervyn Benjamin Jackson, West Brunswick; Wolfgang Hermann Fritz Sasse, East Malvern, both of Australia

[73] Assignees: ICI Australia Limited, Melbourne; Commonwealth Scientific and Industrial Research Organization, Campbell, both of Australia

[21] Appl. No.: 687,323

[22] Filed: May 17, 1976

[30] Foreign Application Priority Data

Jun. 4, 1975 Australia ............................ 1877/75

[51] Int. Cl.$^2$ ............................................. C08L 31/02
[52] U.S. Cl. ............................. 260/885; 204/159.15; 260/875; 260/881; 260/884
[58] Field of Search .................... 260/885; 204/159.15

[56] References Cited

U.S. PATENT DOCUMENTS 3,992,276  11/1976  Powanda et al. ............... 204/159.16

*Primary Examiner*—Carman J. Seccuro
*Attorney, Agent, or Firm*—Cushman, Darby & Cushman

[57] ABSTRACT

A resin comprising a copolymer of an unsaturated benzoin or unsaturated benzoin alkyl ether and a neutral or basic derivative of an unsaturated carboxylic acid, said copolymer having grafted onto it an allylamine.

11 Claims, No Drawings

COPOLYMERS OF AN ALLYLAMINE GRAFTED ONTO AN UNSATURATED BENZOIN COPOLYMER

This invention related to thermally regenerable ion exchange resins; in particular it relates to amphoteric copolymers.

Thermally regenerable resins have a potentially important application in water demineralization processes because low-grade heat can be efficiently employed for regeneration and certain of these resins are of use in the desalination of water.

Processes of ion exchange using thermally regenerable resins are described in the publications:

J. Inst. Engr. Aust. (1965) 37, 193; "An Ion Exchange Process with Thermal Regeneration," Aust. J. Chem. (1966), 19, 561 (Part II), 589 (Part III), 765 (Part IV) and 791 (Part V).

"Thermally Regenerated Ion Exchange Process — An Aid to Water Management," J. water Poll, Control Fed. (1966), 38, 1782; and Australian Pat. No. 274,029".

In the past it has been difficult to obtain amphoteric resins having high thermally regenerable ion exchange capacity as the acid and basic groups in the molecule tend to interact with internal neutralization thus decreasing the number of acid and basic groups available for ion exchange.

We have found new copolymers comprising a copolymer of an unsaturated benzoin or unsaturated benzoin alkyl ether in which internal neutralization in the resin is reduced.

Accordingly, we provide a resin comprising a copolymer of an unsaturated benzoin or unsaturated benzoin alkyl ether and a neutral or basic derivative of an unsaturated carboxylic acid, said copolymer having grafted onto it an allylamine.

We also provide the amphoteric resin obtained by treating the above copolymer to convert the neutral or basic derivative to the free carboxylic group.

In a further embodiment of our invention we provide a process of manufacturing the amphoteric resin described hereinabove said process comprising photografting an allylamine onto a linear copolymer of an unsaturated benzoin or unsaturated benzoin alkyl ether and a neutral or basic derivative of an unsaturated carboxylic acid under light of wave length in the range from 250 to 450 nm, preferably 300 to 400 nm.

The basic or neutral derivative of the unsaturated carboxylic acid may be converted to the free carboxyl group by means readily apparent to those skilled in the art. Most derivatives may be converted to the free carboxyl group by hydrolysis.

Polymeric compositions having appreciable thermally regenerable ion exchange capacity have a molar ratio of amine groups to the acid group in the range from 10:90 to 90:10 preferably from 20:80 to 60:40.

SYNTHESIS OF LINEAR COPOLYMERS

The copolymerzation of unsaturated benzoins or unsaturated benzoin alkyl ethers and the acid derivatives to give a linear copolymer may be carried out in the presence of a free radical initiator.

The process may be carried out in the presence of a solvent. The choice of solvent to be used in the process of our invention is not important.

Preferably the process of our invention is carried out in the presence of a solvent system in which all the monomers are soluble. Most preferably the solvent system is non-aqueous and comprises an organic solvent such as acetone; dimethylformamide; acetonitrile; dimethyl sulphoxide; methyl ethyl ketone; lower alkyl alcohols containing from 1 to 6 inclusive carbon atoms, e.g., methanol, ethanol, propan-2-ol, butan-1-ol; and benzene.

Any unsaturated benzoins and unsaturated benzoin alkyl ethers which copolymerise with derivatives of unsaturated acids may be used. Preferably the compounds are of the general formula I

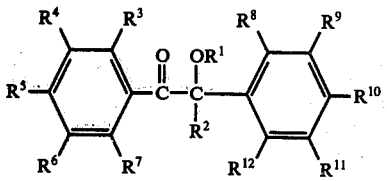

wherein $R^1$ = H or alkyl containing one to six carbon atoms and one of any of $R^2$ to $R^{12}$ is vinyl or allyl and the remainder of $R^2$ to $R^{12}$ are hydrogen, halogen, alkoxy, dimethyl amino, phenyl or nitro and if $R^2$ is not vinyl or allyl it is hydrogen or alkyl containing one to six carbon atoms.

Preferably $R^2$ is vinyl or allyl and $R^3$ to $R^{12}$ are hydrogen. Readily available benzoin alkyl ethers and benzoins for use in our reaction are allyl benzoin (I; $R^1$ = H, $R^2$ = allyl) vinyl benzoin (I; $R^1$ = H, $R^2$ = vinyl), allyl benzoin methyl ether (I; $R^1$ = methyl, $R^2$ = allyl) and vinyl benzoin methyl ether (I; $R^1$ = methyl, $R^2$ = vinyl).

Derivatives of the unsaturated acids include esters, acylhalides, amides, imides, nitriles, acid anhydrides and aminoesters, such as the methyl and other non-charged esters of acrylic, methacrylic, vinylacetic, allylacetic, maleic, maleamic, itaconic and fumaric acids, the amides, imides, nitriles, acid anhydrides and aminoethyl, N-alkylaminoethyl or N, N-dialkylaminoethyl esters of the aforementioned acids.

The nature of the polymerization initiator is not critical. Monomers can be successfully polymerized by the use of chemical initiators. Radiation-initiated polymerization may also be used. When aqueous solvent systems are used water soluble initiators of various sorts, such as potassium persulphate, alpha, alpha'-azo-bis-beta-cyanoisovaleric acid, alpha, alpha'-azo-bis-isobutyramidinium hydrochloride and cumene hydroperoxide, and various redox systems such as $K_2S_2O_8/K_2S_2O_5$ and cumene hydroperoxide/$FeSO_4$ may be employed. When the more preferred solvent systems comprising solvents such as acetone, benzene dimethylformamide and the like are used chemical initiators such as alpha, alpha'-azo-bis-isobutyronitrile, cetyl peroxide carbonate, lauryl peroxide, t-butyl perpivalate, t-butylcyclohexyl peroxydicarbonate, azo-bis-dimethyl-valero nitrile, benzoyl peroxide and organic soluble analogues thereof may be employed.

Copolymers which yield suitable ion-exchange resins have a molar ratio of the benzoin derivative to the acid derivative in the range from 0.5:99.5 to 20:80 preferably from 2:98 to 10:90.

PHOTOGRAFTING REACTION

The nature of the allylamine used in the photografting reaction is not narrowly critical and the compositions of our invention may be prepared using any amine or mixture of amines having one or more allyl substituents. Suitable allylamines include, for example, allylamine, diallylamine, triallylamine and alkyldiallylamines. Other suitable allylamines include compounds of the general formula II

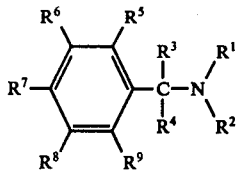

wherein $R^1$ is an allyl group; $R^2$ is either a hydrogen atom or an alkyl or substituted alkyl, which group being either saturated or olefinically unsaturated, $R^3$, $R^4$, $R^5$, $R^6$, $R^7$, $R^8$ and $R^9$ separately, is a hydrogen or halogen atom or an alkyl, substituted alkyl, aryl, substituted nitro, dialkylamino alkyl or

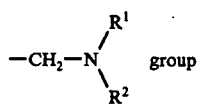 group except that not more than two of $R^3$, $R^4$, $R^5$, $R^6$ and $R^7$ may be the group

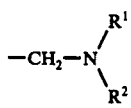

and except that not more than four of $R^3$, $R^4$, $R^5$, $R^6$ and $R^7$ may be hydrogen.

Preferably the olefinically unsaturated group is allyl. A preferred class of compounds of general formula II as defined hereinabove consists of compounds of general formula III:

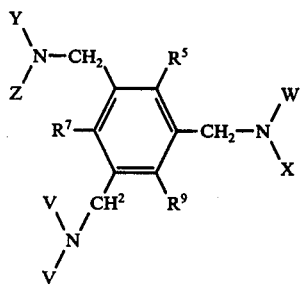

wherein $R^5$, $R^7$ and $R^9$ are as defined hereinabove and U, V, W, X, Y and Z are allyl. A further preferred class of compounds of general formula II as defined hereinabove consists of compounds of general formula IV.

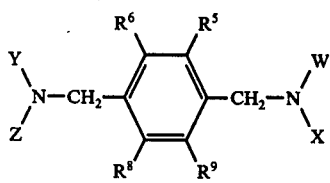

wherein $R^5$, $R^6$, $R^8$ and $R^9$ are as defined hereinabove and W, X, Y and Z are allyl.

Other suitable allylamines include, for example, amines of the general formula V:

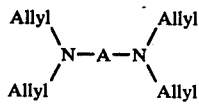

where A is an alkylene group containing 2 to 8, preferably 5 to 7 inclusive carbon atoms, for example, 1,6-bis (N,N-diallylamino) hexane.

Preferred allylamines for use in the preparation of thermally regenerable ion exchange resins include, for example: triallylamine, methyldiallylamine, ethyldiallylamine, 1,4-bis (N,N-diallylaminomethyl) benzene, 2,4,6-tris (N,N-diallylaminomethyl) toluene, 1,2,4-tris (N,N-diallylaminomethyl) benzene, 1,6-bis (N,N-diallylamino) hexane, n-propyl diallylamine, benzyl diallylamine.

It will be understood by those skilled in the art that, in order to polymerize the allylamines they must normally be present as salts. Hence all references in this specification to polymerization of allylamines, even when not specifically described as salts, are to the amines in their polymerizable form.

Suitable salts are the salts of allylamines with strong acids such as, for example, hydrochloric, sulphuric, nitric or phosphoric acid. Generally speaking, the pH, temperature and other conditions associated with the polymerization process may be those known in the art for the polymerization of the appropriate monomers concerned.

Additionally crosslinkers may be added to the photopolymerization system and to obtain adequate crosslinking it is necessary to add a crosslinking agent when amines containing only two or less allyl groups are used. Suitable crosslinking agents are well known in the art and include for example, ethylene glycol dimethacrylate, 1,3-butylene glycol dimethacrylate, divinylbenzene, triallyl cyanurate and the triallyl ether of pentaerythritol.

Preferably the crosslinking agent is a salt of triallylamine or of a bis (diallylamino) alkane wherein the chain contains from 2 to 8 carbon atoms.

The concentration of the reaction mixture to some extent controls the amount of crosslinking occurring during the reaction. We have found that a high concentration leads to a higher degree of crosslinking in the product. The solid concentration is preferably greater than 40% w/w.

The choice of solvent to be used in the photografting process of our invention is important. We have found that reaction in aqueous or partly aqueous solutions in general gives only low yields of polymeric compounds.

Preferably the process of our invention is carried out in the presence of a solvent system in which the polymer and amine monomer are soluble. Most preferably the solvent system is non-aqueous and comprises a polar organic solvent such as acetone, dimethylformamide, acetonitrile, dimethyl sulphoxide, methyl ethyl ketone, lower alkyl alcohols containing from 1 to 6 inclusive carbon atoms, e.g., methanol, ethanol, propan-2-ol, butan-1-ol.

The yield and properties of the photografted polymers depend on intensity of U.V. irradiation and the total irradiation received.

Irradiation of solutions was found to yield satisfactory products providing the walls of the reaction flask were kept clean of deposited polymer by using a mechanical scraper or by using a silylated flask and stirrer. We prefer to use a suspension system in which case the walls remain clean. Any suspending medium which is transparent and inactive to U.V. radiation may be used. We prefer to use hexane or paraffin oil.

The temperature is not critical but we prefer to carry out the irradiations at between 20° and 60° C.

The stirring rate is critical for particle size, but not for thermally regenerable ion exchange capacity. The stirring rate required to obtain resin of the required particle size and shape can be obtained by experiment.

The product of our process may be made in the form of beads of roughly the same size as conventional ion exchange resins, for example, beads for the manufacture of ion exchange resins used in large scale ion exchange columns are in the size from 200 mesh B.S.S. to 10 mesh B.S.S. preferably 52 mesh B.S.S. to 14 mesh B.S.S.

UNBLOCKING AND EQUILIBRATION

The polymeric composition obtained from the photografting is treated to convert the derivative of the carboxyl groups to form an amphoteric polymeric composition comprising free carboxyl groups. Any procedure known in the art may be employed which is capable of converting the blocking group to an ion-exchange site, but, is not capable of destroying the polymer chain. Thus for example when an ester, amide, imide, nitrile or acid anhydride is used as the precursor, it may be hydrolysed by treatment of the polymeric composition with dilute aqueous acid or alkali. We prefer where possible to treat such a polymeric resin with aqueous caustic soda solution under reflux for several hours. This alkali treatment will also convert precursors formed from tertiary amines and chlorinated carboxylic acids to the original tertiary amino form. When a nitrile is used as the precursor for a basic group, hydrogenation or reduction to the primary amino form will be necessary.

It is preferable to subject the product resin to a pH equilibration treatment to achieve the optimum ion-exchange performance. Normally, this simply involves stirring the resin in an aqueous salt solution at room temperature (ca. 20° C) and adding sodium hydroxide until the desired pH level is obtained, care being taken to ensure that the final equilibrium salt concentration is at the required level. The salt concentration employed is that of the water to be treated by the desalination process. The resin is now suitable for use in column operation of a thermally regenerable process, as described in Australian Pat. No. 274,029. For purposes of evaluation, however, the resin may be washed with hot water at ca. 80° C to obtain it in a regenerated form, and the amount of salt taken up by stirring the regenerated resin in salt solution at room temperature used as a measure of the effective capacity of the system. The time necessary to achieve salt uptake equivalent to 50% of the equilibrium level (the "half time") may be used as a convenient measure of the rate of salt adsorption.

The invention is now illustrated by, but by no means limited to, the following examples:

COPOLYMERS OF ACID PRECURSORS AND BENZOIN DERIVATIVES

EXAMPLE 1

A solution of methyl acrylate (11.0 g), allylbenzoin methyl ether (ABME), (0.22 g), benzene (9 ml) and AIB (0.3 g, 2.5 w/w %) was saturated with nitrogen and heated at 70° for 20 hours with slow stirring. After cooling, benzene (30 ml) was added and the mixture stirred until all the glassy material had dissolved and the solution poured into hexane (300 ml) with stirring. The sticky precipitate was redissolved in benzene (50 ml) and again precipitated into hexane (300 mls) and dried in vacuo to give 8.5 g (75%). From the UV spectrum of a sample of the product, it was found to contain 1.8% (w/w) ABME and had a molecular weight of 120,000 in benzene by viscometry measurement assuming the relationship $$(\eta) = 2.58 \times 10^{-5} M^{0.85}$$

i.e., there are about 8 ABME units per polymer chain.

EXAMPLE 2

A copolymer with 16.7% (w/w) (ABME) (5.9 mole %) was prepared by a method similar to example 1.

EXAMPLE 3

A copolymer with 18% (w/w) ABME was prepared by a method similar to example 1.

EXAMPLE 4

A copolymer with 4% (w/w) ABME (1.3 mole %) was prepared by a method similar to example 1.

EXAMPLE 5

A copolymer with 9% (w/w) ABME (3.2 mole %) was prepared by a method similar to example 1.

EXAMPLE 6

A copolymer with 22.7% (w/w) ABME (9 mole %) was prepared by a method similar to example 1.

EXAMPLE 7

A copolymer with 13.5% (w.w) vinylbenzoin methyl ether was prepared by a method similar to example 1.

PHOTOGRAFTING AND HYDROLYSIS

EXAMPLE 8

A solution of copolymer of Example 4 (26.6 ml, 4.3 g polymer) in benzene and anhydrous triallylamine hydrochloride (TAA.HCl) (5.2 g) was saturated with nitrogen by stirring under nitrogen for 5 minutes and then irradiated with stirring at 300 rpm for 2 hours. The solution became turbid after about ½ hour. The white slurry was diluted with benzene to about 50 ml and poured into methanol (500 ml). The precipitate was washed by stirring in an Omnimix (Registered Trade Mark for a laboratory mixer) with methanol, filtered through a sintered glass funnel and dried in vacuo to give a white solid (6.4 g, 67%). Anal: calc. for $(MA)_4$ (TAA.HCl): C 57.9, H 7.73, N 2.7, Cl 6.85%. Found: C 55.7, H 7.41, N 2.61, Cl 6.6%. The polymer was insoluble in water, partly soluble in benzene and about 60% soluble in acetone.

A sample of the polymer (2.5 g) was stirred in an Omnimix with 2N sodium hydroxide (100 ml) and then transferred to a flask and heated at 95° C for 24 hours. After cooling, the product was centrifuged at 200 rpm for 25 minutes. The precipitate was repeatedly washed and centrifuged with pH 10 sodium hydroxide until the pH of the supernatant was 10 (10 washings were required) and dried in vacuo to give 0.64 g of polymer. A sample (0.07 g) in 0.5M sodium chloride (20 ml) was titrated with 0.1 N hydrochloric acid. From the titration it was found that the amine capacity≃acid capacity≃4 meq/g This example was repeated using the copolymer formed in Examples 1, 3 and 5, 6 and 7. In each case amphoteric resins were obtained.

EXAMPLES 9 to 12

The details of these grafting experiments are given in Table 1.

EXAMPLE 13

Copolymer of example 2 (3.65 g), DMF (6 ml) and anhydrous TAA.HCl (6.48 g) was shaken overnight and then added to stirred paraffin oil (90 ml) under nitrogen and irradiated for one hour with stirring at 550 rpm. The slurry was diluted with hexane and the mixture filtered through a sintered glass funnel under suction and washed successively with hexane (2X), acetone (3X) and methanol (2X) and then hydrolyzed by heating at 90° with 5N aqueous KOH (90 ml) with slow stirring for 24 hours under nitrogen, and then washed successively in a column with 0.3N NaOH, 2N HCl and pH 3 HCl and dried in vacuo at 50° to give a fine, almost white, powder (5.9 g, 58%). Under a microscope, the particles were found to have a diameter of about 20 μ.

EXAMPLES 14 to 35

These examples were performed similarly to example 13. Details are given in Tables II and III.

Acid and amine capacities were determined by successive titration with HCl and $AgNO_3$. Thermal regenerable ion exchange capacities were measured on samples equilibrated at pH 6.8 and regenerated at 80° with water.

TABLE I
PHOTOCHEMICAL GRAFTING OF TAA . HCl ON TO COPOLYMER OF EXAMPLE 2

| Example[b] No | Wt copolymer[a] (g) | Solvent (mls) | TAA . HCl[a] (g) | Properties of crosslinked polymer after hydrolysis | | | | |
|---|---|---|---|---|---|---|---|---|
| | | | | Wt. (g) | Yield % | Capacity (me/g) | | |
| | | | | | | Acid | Amine | Acid:Amine |
| 9 | 0.64 | benzene (1.0) | 1.09 | 0.22 | 13 | 1.4 | 3.8 | 0.37 |
| 10 | 0.63 | DMF (1.0) | 1.08 | 0.30 | 17 | 1.7 | 3.9 | 0.43 |
| 11 | 0.70 | acetone (0.7) | 1.19 | 0.19 | 10 | 1.4 | 4.0 | 0.35 |
| 12 | 0.67 | DMF (1.0) | 0.50 | 0.14 | 12 | 2.55 | 2.8 | 0.91 |

[a]Equivalents of available acid: equivalents of amine = 1.0 in example 9–11; in example 12 the ratio was 2.0.
[b]All solutions were irradiated for 80–90 mins. with 360 nm light.

TABLE II
FURTHER PHOTOCHEMICAL GRAFTING EXPERIMENTS OF TAA . HCl ON TO COPOLYMER OF EXAMPLE 2

| Example No | Suspending medium | Stirring rate (rpm) | Irradiation time (mins) | Solvent for suspension | % Solids | Comments[c] |
|---|---|---|---|---|---|---|
| 13 | Paraffin oil | 550 | 60 | dimethylformamide | 63 | — |
| 14 | " | 90 | 90 | " | 63 | — |
| 15 | hexane | 960 | 90 | " | 52 | 18.5% EGDMA[a] 2% surfactant[b] |
| 16 | " | 960 | 90 | " | 55 | 25.6% EGDMA 1% surfactant |
| 17 | " | 860 | 90 | " | 40 | 9% EGDMA |
| 18 | " | 580 | 90 | " | 40 | 9% EGDMA Teflon stirrer |
| 19 | paraffin oil | 113 | 90 | " | 40 | 9% EGDMA |
| 20 | hexane | 670 | 90 | " | 33 | 9% EGDMA |
| 21 | paraffin oil | 550 | 60 | acetone | 63 | — |
| 22 | hexane | 860 | 60 | dimethylformamide | 52 | — |
| 23 | " | 860 | 60 | " | 48 | copolymer of example 4 |
| 24 | " | 860 | 60 | " | 48 | copolymer of example 5 |
| 25 | hexane | 760 | 60 | dimethylformamide | 48 | copolymer of example 6 |
| 26 | paraffin oil | 125 | 60 | " | 52 | silylated flask |
| 27 | " | 125 | 60 | tetrahydrofuran | 60 | — |
| 28 | " | 100 | 60 | dimethylformamide | 52 | ¼ light intensity |
| 29 | " | 100 | 180 | " | 52 | — |
| 30 | " | 100 | 60 | " | 53 | acid:amine = 0.88, 4% HEXA[d] |
| 31 | " | 100 | 90 | " | 53 | acid:amine = 0.88, 8% HEXA |
| 32 | " | 100 | 90 | " | 53 | acid:amine = 2.0 |
| 33 | " | 100 | 90 | " | 53 | acid:amine = 3.0 |
| 34 | " | 150 | 90 | " | 54 | acid:amine = 2.0 9% EGDMA, 4%.HEXA[d] |

TABLE II-continued
FURTHER PHOTOCHEMICAL GRAFTING EXPERIMENTS OF TAA . HCl ON TO COPOLYMER OF EXAMPLE 2

| Example No | Suspending medium | Stirring rate (rpm) | Irradiation time (mins) | Solvent for suspension | % Solids | Comments[c] |
|---|---|---|---|---|---|---|
| 35 | " | 150 | 90 | iPrOH | 57 | ethylacrylate:ABME |

[a] Ethyleneglycol dimethacrylate.
[b] Synprol sulphate and Span 20 (1:1) (Synprol and Span are Registered Trade Marks).
[c] equiv. of available acid: equiv. of amine = 1.0 for examples 13 to 29.
[d] 1,6-bis (N,N-diallylamino)hexane.

TABLE III
FURTHER PHOTOCHEMICAL GRAFTING EXPERIMENTS OF TAA.HCl ON TO COPOLYMER OF EXAMPLE 2

Properties of crosslinked polymer after hydrolysis

| Example No | Yield (%) | Capacity (meq/g) Acid | Capacity (meq/g) Amine | Acid:Amine ratio | Thermal Capacity meq/g | Appearance |
|---|---|---|---|---|---|---|
| 13 | 58 | 2.2 | 3.7 | 0.6 | 0.31 | opaque, regular in size ~20μ |
| 14 | 50 | 2.45 | 2.44 | 1.0 | 0.11 | opaque, regular in size ~20μ |
| 15 | 52 | 3.2 | 1.8 | 1.8 | 0.36 | quite hard |
| 16 | 63 | 2.55 | 1.78 | 1.43 | 0.13 | hard |
| 17 | 53 | 3.74 | 1.48 | 2.5 | 0.08 | very hard |
| 18 | 34 | 1.06 | 3.44 | 0.31 | 0.01 | softer than 17 |
| 19 | 62 | 2.78 | 2.33 | 1.2 | — | — |
| 20 | 42 | 3.44 | 1.0 | 3.4 | 0.35 | heterogeneous |
| 21 | 51 | 2.27 | 3.17 | 0.72 | 0.21 | transparent, 50–200 |
| 22 | 44 | 2.05 | 3.39 | 0.60 | 0.24 | heterogeneous |
| 23 | 11 | 1.28 | 3.94 | 0.32 | — | heterogeneous, very soft |
| 24 | 35 | 2.14 | 3.42 | 0.62 | 0.04 | harder than 23 |
| 25 | 47 | 2.42 | 3.14 | 0.77 | 0.27 | heterogeneous, harder than 24 |
| 26 | 48 | 2.0 | 3.0 | 0.67 | — | — |
| 27 | 25 | 1.11 | 3.56 | 0.31 | — | fairly homogeneous |
| 28 | 18 | 0.89 | 3.78 | 0.23 | — | — |
| 29 | 50 | 2.38 | 3.56 | 0.67 | 0.23 | — |
| 30 | 45 | 2.00 | 3.44 | 0.58 | 0.29 | heterogeneous, hard |
| 31 | 45 | 0.78 | 3.11 | 0.25 | 0.23 | not very heterogeneous, hard |
| 32 | 45 | 3.12 | 2.27 | 1.37 | 0.69 | heterogeneous |
| 33 | 13 | 3.17 | 2.22 | 1.43 | 0.74 | — |
| 34 | 47 | 3.23 | 1.63 | 1.98 | 0.18 | hard |
| 35 | 52 | 2.23 | 3.44 | 0.65 | 0.36 | — |

We claim:

1. A resin comprising a copolymer of an unsaturated benzoin or unsaturated benzoin alkyl ether and an ester of an unsaturated carboxylic acid, said copolymer having grafted onto it an allylamine and wherein the molar ratio of benzoin derivative to acid derivative is in the range 0.5:99.5 to 20:80.

2. A resin according to claim 1 wherein the unsaturated benzoin or unsaturated benzoin alkyl ether is chosen from the group consisting of allylbenzoin, vinyl benzoin, allyl benzoin methyl ether and vinyl benzoin methyl ether.

3. A resin according to claim 1 wherein the ester is an ester of unsaturated carboxylic acid chosen from the group consisting of acrylic, methacrylic, vinylacetic, allylacetic, maleic, maleamic, itaconic and fumaric acids.

4. A resin according to claim 1 wherein the molar ratio of benzoin derivative to acid derivative is in the range from 2:98 to 10:90.

5. A resin according to claim 1 wherein the allylamine is chosen from the group consisting of triallylamine, methyldiallylamine, ethyldiallylamine, 1,4-bis (N,N-diallylaminomethyl) benzene, 2,4,6-tris (N,N-diallylaminomethyl) toluene, 1,2,4-tris (N,N-diallylaminomethyl) benzene, 1,6-bis (N,N-diallylamino) hexane, n-propyl diallylamine and benzyl diallylamine.

6. An amphoteric resin obtained by treating the resin of claim 1 to convert the ester to the free carboxylic group.

7. An amphoteric resin according to claim 6 wherein the molar ratio of amine groups to acid groups is in the range from 10:90 to 90:10.

8. An amphoteric resin according to claim 7 wherein the molar ratio of amine groups to acid groups is in the range from 20:80 to 60:40.

9. A process of manufacturing the resin according to claim 1, said process comprising photografting an allylamine onto a linear copolymer of an unsaturated benzoin or unsaturated benzoin alkyl ether and said ester of an unsaturated carboxylic acid under light of wave length in the range from 250 to 450 nm.

10. A process according to claim 9 wherein the wave length is in the range from 300 to 400 nm.

11. A process of converting a resin according to claim 1 to an amphoteric resin wherein the ester is converted to the free carboxyl group by hydrolysis.

* * * * *